Patented May 26, 1931

1,807,304

UNITED STATES PATENT OFFICE

ROBERT CALVERT, OF WILMETTE, ILLINOIS, ASSIGNOR TO VAN SCHAACK BROS. CHEMICAL WORKS, INC., OF CHICAGO, ILLINOIS, A CORPORATION OF ILLINOIS

ESTER OF DIETHYLENE GLYCOL

No Drawing.  Application filed June 25, 1928.  Serial No. 288,305.

My invention relates to an ester of a higher fatty acid with an ether-alcohol. By the term "ether-alcohol" I mean an alcohol which contains not only one or more hydroxyl groups but also an ether group.

Examples of esters of an ether-alcohol with a higher fatty acid that fall within my invention follow:

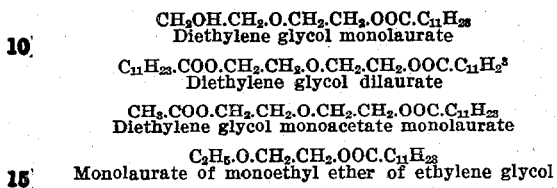

Other examples are related chemically to the above types but have the lauric acid radical substituted by the radical of some other fatty acid containing more than 10 carbon atoms to the molecule, as, for example, myristic, palmetic, stearic, oleic, ricinoleic, linoleic, or linolenic acid. Other examples are related to the above types and contain the radical of a higher fatty acid, as, for example, one of the acids mentioned above, but differ from the compounds shown in the illustrative formulas in having substituted for the radical of acetic acid the radical of some other lower fatty acid, as, for example, propionic, butyric, or valeric acid.

An example in which the radicals of both acetic acid and lauric acid have been substituted by other radicals is

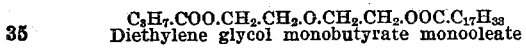

The compounds of the type of this invention are materials that either decompose on attempted distillation or boil only at very high temperatures at very low pressures. Some of them are liquids at room temperatures, others are solids more or less resembling tristearin in appearance. They are soluble in hydrocarbon solvents, such as toluol, and in various esters. Being very slowly volatile or substantially non-volatile at ordinary temperatures, they may be used to blend with certain volatile materials, as, for example, certain perfumes, to decrease the volatility of the volatile material.

In preparing an ester of the type of my invention, I may proceed as follows: Digest the selected ether-alcohol with the selected organic acid or acids in the presence of a trace of sulfuric acid as catalyst. Remove the water formed by maintaining the reacting mass at an elevated temperature, say, 110° C., and blowing a small stream of air through. In some cases it is more satisfactory to add a relatively large amount of benzol to the reaction mixture, distil through a fractionating column, condense, separate and reject the lower aqueous layer of condensate, return to the reaction vessel the upper layer consisting largely of benzol, and continue thus until the esterification is substantially complete. In case the ether-alcohol contains two hydroxyl groups and is to be esterified with two different acids, I may esterify, as above described, with sufficient of one of the organic acids to react with just one of the hydroxyl groups. Then, after titration shows that most of the organic acid has been consumed (esterified), I may add sufficient of the second acid to esterify the second hydroxyl group, and continue the esterification process.

At the conclusion of the esterification, I may neutralize or destroy the mineral acid used as a catalyst, as, for example, by adding sodium carbonate in slight excess. Or, I may convert the mineral acid into a salt and liberate the corresponding amount of a weak acid that is also volatile and, therefore, easily removed by partial distillation of the product in vacuo. Thus, I may add an excess of potassium acetate, heat and agitate, and then pass a slow stream of air through the mixture, in a vacuum still, at such a temperature that the resulting acetic acid is volatilized. The vacuum distillation may be continued until certain undesired raw materials or by-products of the esterification reaction are removed also and there is left in the still a mixture of a minimum vapor pressure at the temperature of the still.

Illustrative examples of details of preparing certain specific esters of ether-alcohols with higher fatty acids now follow. All proportions are given by weight.

One preparation gave a composition comprising laurate of diethylene glycol. A sample of mixed fatty acids obtained from cocoanut oil was redistilled in vacuo. When 75% of the weight of fatty acids charged to the still had been distilled, the distillation was discontinued and the distillate used as a source of lauric and other fatty acids. The average equivalent weight of this distillate was found by titration with standard alkali to be 214. One hundred and seven parts of this were mixed with 64 of diethylene glycol, 160 of benzol, and 0.2 of sulfuric acid. The mixture was kept boiling for 14 hours, benzol and water vapor passing upward through a fractionating column and then to a down condenser.

In the condensate two layers appeared. The lower, aqueous layer was discarded, the upper layer was returned to the reacting mass continuously. After the 14 hours' boiling, there was added to the boiling vessel 0.4 part soda ash and 10 parts of Norit decolorizing carbon. After an hour's additional heating, the mixture was filtered. Benzene and other low boiling materials were then removed by distillation in a slow stream of air, the distillation being finally discontinued at a temperature (within the liquid) of about 200° C. and a pressure equal to 11 mm. of mercury. The product remaining in the still contained free acid equal to 0.047%, calculated as acetic, had the specific gravity of 0.929 at 24° C. as compared to water at 20° C., and, on saponification, showed that the equivalent weight as ester was 261. This product comprises mono- and dilaurate of diethylene glycol.

In another preparation, a similar procedure was followed, except that there was used the entire mixture of acids obtained from cocoanut oil. This mixture had an equivalent weight as acid of 224.

A third preparation gave a composition comprising diethylene glycol monoacetate monolaurate. One hundred and six parts of cocoanut oil fatty acids (one-half monecular proportion), obtained by partial distillation as described above, and 100 of benzol were added to a benzol solution comprising slightly more than one-half a molecular proportion of diethylene glycol monoacetate that had been prepared from 55.6 parts diethylene glycol, 31.5 of acetic acid, 0.4 of $H_2SO_4$, and 70 of benzol, by fractionation for 2½ hours at 79½° to 91° C., with continuous separation of the water from the condensate and return of the benzol layer to the still. The fractionation with water separation was continued, after adding the cocoanut oil acids and additional benzol, for 10 hours, or until substantially all of the organic acid had esterified. The mixture was then refluxed with a 200% excess of potassium acetate to destroy the sulfuric acid and with 30 parts of decolorizing carbon to decolorize. After filtration, the product was heated first to remove the benzol and then, under a pressure of 4 m. m. in an oil bath at 200° C., to remove any other materials which could be distilled at such a temperature.

In another prepartion, 61 parts of oleic acid, 120 of benzol, and 0.07 of sulfuric acid were added to a benzol solution of 32 parts of diethylene glycol monoacetate and 0.03 of sulfuric acid. The mixture was refluxed for 19 hours at 88–90° C., or until substantially all of the oleic acid was esterified. The mixture was then refluxed with a 200% excess of potassium acetate to destroy the sulfuric acid (with the liberation of the corresponding amount of acetic acid) and with 30 parts of Norit to decolorize. After filtration the product was distilled first to remove the benzol and then, under a pressure of 5 m. m. in an oil bath at 200° C., to remove any other materials which could be distilled at such a temperature.

Triethylene glycol may be substituted for diethylene glycol in the above prepartions.

By the terms "radical of a fatty acid" or "radical of an aliphatic acid" I mean the radical left after the removal of the hydrogen atom from the carboxyl group of a fatty acid. Examples of such radicals are $CH_3 \cdot COO-$, $C_{11}H_{23} \cdot COO-$, and $C_{17}H_{35} \cdot COO-$.

I claim:

1. A composition of matter comprising an ester of an alcohol containing at least one ether group and originally at least two hydroxyl groups, one of which hydroxyl groups is replaced, in the finished ester, by the radical of an aliphatic acid containing less than five carbon atoms to the molecule, and another hydroxyl group is replaced by the radical of an aliphatic acid containing more than ten carbon atoms to the molecule.

2. A composition of matter comprising an ester of an alcohol containing at least one ether group and originally at least two hydroxyl groups, one of which hydroxyl groups is replaced, in the finished ester, by the radical of acetic acid, and another hydroxyl group is replaced by the radical of an aliphatic acid containing more than ten carbon atoms to the molecule.

3. A composition of matter comprising the product of the esterification of the monoacetate of diethylene glycol with a mixture of fatty acids derived from cocoanut oil.

4. A composition of matter comprising an ester represented by the general formula $C_{11}H_{23}COO \cdot CH_2 \cdot CH_2 \cdot O \cdot CH_2 \cdot CH_2 \cdot R_1$ in which $R_1$ stands for the radical of a fatty acid containing less than five carbon atoms to the molecule.

5. A composition of matter comprising an ester of the formula $C_{11}H_{23}COO \cdot CH_2 \cdot CH_2 \cdot O \cdot CH_2 \cdot CH_2 \cdot OOC \cdot CH_3$.

6. A composition of matter comprising an ester whose composition is expressed by the general formula $$R_2.CH_2.CH_2.O.CH_2.CH_2.R_1,$$

in which $R_2$ represents the radical of an aliphatic acid containing more than ten carbon atoms to the molecule and $R_1$ represents the radical of an aliphatic acid containing less than five carbon atoms to the molecule.

7. A composition of matter comprising the product of the esterification of the monoacetate of diethylene glycol with the mixture of fatty acids obtained, as distillate, on distilling approximately three-fourths of a sample of fatty acids from cocoanut oil.

8. A composition of matter comprising the product of the esterification of the monoacetate of diethylene glycol with the mixture of fatty acids obtained, as distillate, on distilling approximately three-fourths of a sample of fatty acids from cocoanut oil, said distillate having an average equivalent weight, as acid, of approximately 214.

9. A composition of matter comprising an ester of the general formula $$R_2.CH_2.CH_2.O.CH_2.CH_2.R_1,$$

in which $R_1$ represents the radical of an aliphatic acid containing less than five carbon atoms to the molecule and $R_2$ represents a mixture of fatty acids derived from cocoanut oil.

10. A composition of matter comprising an ester of the general formula $$R_2.CH_2.CH_2.O.CH_2.CH_2.R_1,$$

in which $R_1$ represents the radical of an aliphatic acid containing less than five carbon atoms to the molecule and $R_2$ represents a mixture of fatty acids derived from cocoanut oil, said mixture having an equivalent weight, as acid, that is not substantially above 214.

ROBERT CALVERT.